United States Patent [19]

Miller

[11] 4,073,042
[45] Feb. 14, 1978

[54] SAFETY HOOK
[75] Inventor: Franklin L. Miller, Portland, Oreg.
[73] Assignee: Esco Corporation, Portland, Oreg.
[21] Appl. No.: 635,763
[22] Filed: Nov. 26, 1975
[51] Int. Cl.² .......................................... A44B 13/02
[52] U.S. Cl. ............................. 24/241 P; 294/82 R
[58] Field of Search ......... 24/241 P, 241 PL, 241 PS, 24/241 SP; 294/82 R, 82 AH, 83 R

[56] References Cited
U.S. PATENT DOCUMENTS

| | | | |
|---|---|---|---|
| 1,144,099 | 6/1915 | Black | 24/241 PL |
| 1,173,001 | 2/1916 | Keegan | 24/241 SP |
| 1,715,192 | 5/1929 | Fortin | 24/241 PL |
| 2,381,531 | 8/1945 | Ehmann | 294/82 R |
| 3,126,604 | 3/1964 | Smith | 24/241 PL |

Primary Examiner—Paul R. Gilliam
Assistant Examiner—Kenneth J. Dorner
Attorney, Agent, or Firm—Tilton, Fallon, Lungmus & Chestnut

[57] ABSTRACT

A safety hook for use with a sling wherein the hook is equipped with a simple, yet sturdy pivotal latch for locking a load in position.

2 Claims, 1 Drawing Figure

SAFETY HOOK

BACKGROUND AND SUMMARY OF INVENTION

This invention relates to a safety hook and more particularly to a hook with a reliable, yet simple safety latch. Hooks with safety latches have been known for a long time but for the most part are excessively large and complicated — see, for example, U.S. Pat. Nos. 3,126,604 and 2,835,013 (Class 24-241). The prior art has employed resiliently mounted latch members to close the throat between the shank and bill of a load hook. However, the mounting and operation of the latching members in the prior art has been sufficiently complicated so as to deter their wide spread usage. In contrast, the instant invention provides a simple, yet reliable arrangement wherein the latch member is pivotally connected directly to the shank of the hook for a sturdy lock, yet one which is foolproof and simple in operation. Other advantages and objectives of the invention may be seen in the ensuing specification.

DETAILED DESCRIPTION

The invention is illustrated in conjunction with the accompanying drawing, in which FIG. 1 is a perspective view of one embodiment of the inventive hook;

Figure 1:
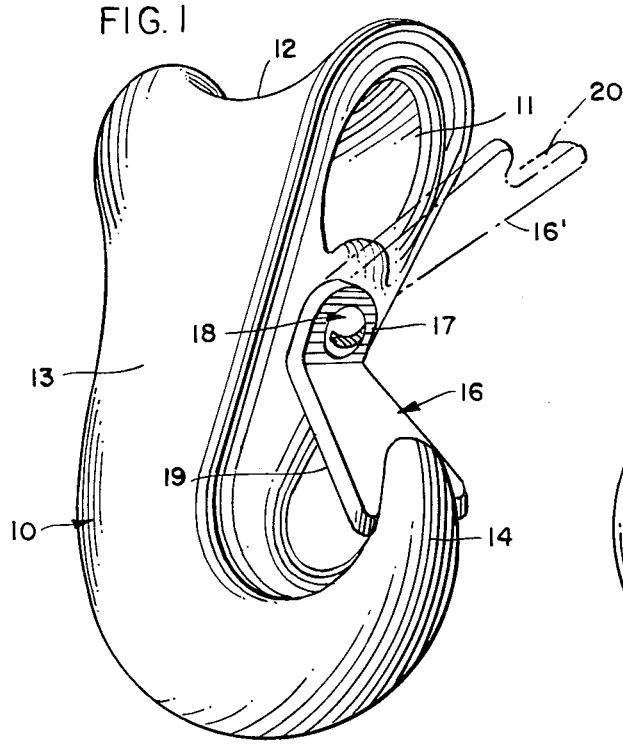

In the illustration given, and with particular reference first to FIG. 1, the numeral 10 designates generally a hook constructed according to the teachings of this invention. The particular hook illustrated in the drawing is intended for use with a sling and for that purpose has at its upper end a sling passage or eye 11 for the receipt of a wire rope sling (not shown). It will be appreciated that the hook normally is cast as a unitary piece out of alloy steel and thus the passage or bore 11 can be readily contoured and the upper surface 12 also conforms to the contour of the passage 11. It will be appreciated that the advantages of the instant invention apply to load hooks of varying construction and design.

The cast hook body 10 has a shank portion 13 immediately below the passage 11 which curves forwardly and then upwardly to provide the usual bill portion 14. As can be readily appreciated from a consideration of FIG. 2, the bill 14 is spaced forwardly of the shank 13 and is in confronting relation therewith to define a throat 15. The throat is closed by the latch member generally designated 16. A load can be placed on the hook 10 by rotating the safety latch 16 to the dotted line position 16' — the invention being concerned with the latch and its mounting which achieves this.

Figure 2:
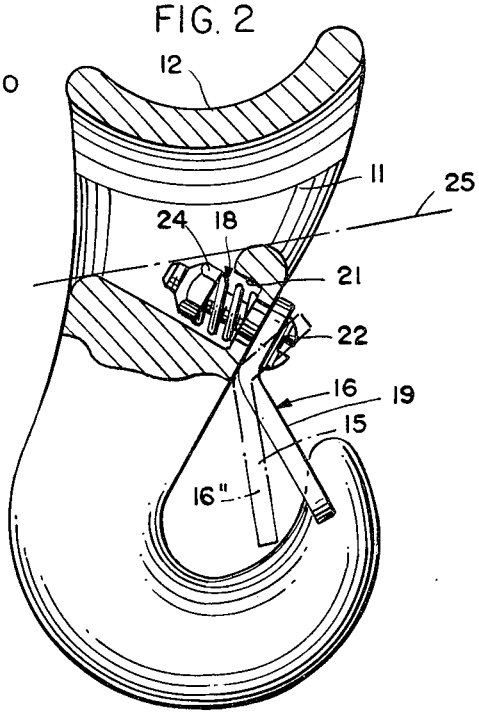
FIG. 2 is a side elevational view, partially in section, of the hook of FIG. 1 and showing the alternative position of the latch member in dashed line.

The latch member 16 is essentially L-shaped having an upper leg 17 which is pivotally secured to the shank 13 by means of the spring loaded bolt and nut arrangement generally designated 18 (see also FIG. 2). The latch member 16 also includes a lower link 19 which is bifurcated at its lower end as at 20 (see FIG. 1) so as to conform to the contour of the upper portion of the bill 14.

Figure 3:
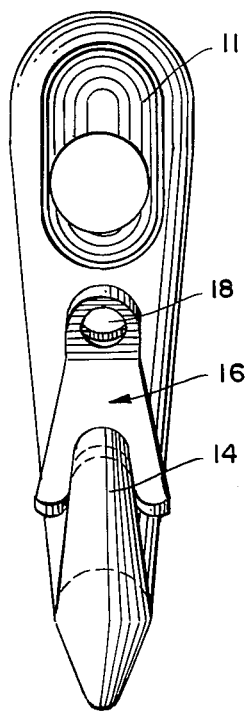
FIG. 3 is a front elevational view of the hook of FIG. 1.

In the form of the invention illustrated in FIGS. 1–3, the shank 13 is equipped with a recess as at 21 (see FIG. 2) into which the threaded bolt 22 is inserted. The recess 21 is generally cylindrical and accommodates a spring 23 and nut 24. The spring 23 bears at one end against the seat 21a in the recess 21 and at the other end against the nut 24. As is clearly seen in FIG. 2, the latch 16 can be rocked inwardly to the position designated 16" where the bifurcated end 20 of the latch 16 can pass by the bill 14 to as to put the latch 16 in the 16' position of FIG. 1. The recess 21 is sized and arranged so that the end of the assembly 18, for example, the threaded end of the bolt 22, is below the tangent line 25 — so as not to interfere with a wire rope sling inserted into the eye 11.

Figure 4:
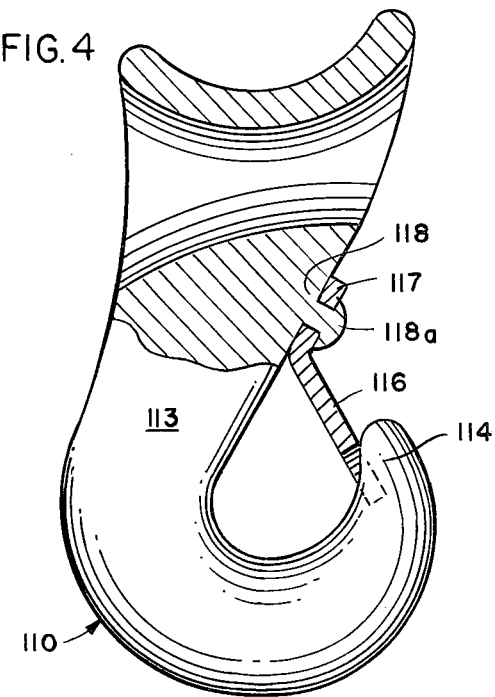
FIG. 4 is a view similar to FIG. 2 but of a modified form of the invention.

The modified form of the invention seen in FIG. 4 includes an essentially similar hook 110 consisting of the shank 113 merging into the bill 114. The latch member 116 in this illustration is constructed of spring material and eliminates the need for the compression spring 23. The shorter leg 117 of the L-shaped latch member 16 is substantially rigidly connected to the shank 13 by virtue of peening or riveting the head 118a of an integral stud 118.

The operation of the embodiment of FIG. 4 is similar to that of the embodiment in FIGS. 1–3. The locked position of the latch member 16 or 116 is accomplished by the contour 20 of the lower end of the latch member 16 so as to conform with the bill of the hook. The latch member 16 or 116 is forced downwardly until it clears the point of the bill 14 or 114, i.e., to the position 16", before it can be opened to position 16' by pivoting. The contoured end 20 of the latch member 16 or 116 extends past the diameter of the bill 14 far enough to prevent the same being opened by any forces except those combining first downward or inward direction and thereafter a lateral direction.

A significant advantage of both embodiments of the invention over existing safety latches on hooks is that it does not occupy space in the throat or opening of the hook thus allowing an unobstructed access to attach a load. Also, there is more unobstructed use of the area within the hook as it is unnecessary to push the lever latch member all the way down to unload the hook. More particularly, the mounting of the latch member is internal of the hook, as contrasted to the latch mounting many swivel type hooks. This is extremely advantageous in sling hook usage. The mounting of the hook on the surface of the shank confronting the point of the bill provides an extremely advantageous manner of pivoting the latch in an arc parallel to the confronting surface 13a of the shank 13. This makes possible an access opening above the point of the bill 14 (when the latch member is in the 16' position) which is equal to or greater than the throat 15 — and the entire unlatching and latching operation can be performed with one hand. The mounting provides an advantageous slimness of profile which avoids any inadvertant destruction of the latch during the rough usage normally encountered with such hooks.

I claim:

1. A safety hook comprising a unitary body having a shank curving downwardly and forwardly into a bill with the upper end of said bill being in spaced relation to said shank to provide a throat, said body at the upper end thereof being equipped with a passageway adapted to receive a wire rope, said passageway extending from the rear of said body forwardly therethrough, said passageway being relatively elongated and being longitudinally arcuate, a latch member pivotally mounted on said shank and extending across said throat in a first position to releasably engage said bill to close said throat, a bolt pivotally securing said latch member to said shank for arcuate movement of said latch member to a second position upon said bill, said passageway having a smooth upper wall and a lower wall interrupted to provide a forwardly extending recess terminating in a bolt-receiving opening, said bolt extending through said opening into said recess, and a spring and nut in said recess mounted on said bolt, said recess being constructed and arranged relative to said nut and bolt so as to shield the same from a wire rope in said passageway.

2. The safety hook of claim 1 in which said latch member is generally L-shaped having a first leg mounted on said shank and a second leg extending across said throat into releasable engagement with said bill, said bolt extending through said first leg with said first leg being shorter than said second leg.

* * * * *